United States Patent [19]

Lotto

[11] 4,101,363
[45] Jul. 18, 1978

[54] METHOD OF MAKING BOTTOM SEAL THERMOPLASTIC BAGS

[75] Inventor: Ronald L. Lotto, Bonduel, Wis.

[73] Assignee: FMC Corporation, San Jose, Calif.

[21] Appl. No.: 344,700

[22] Filed: Mar. 26, 1973

Related U.S. Application Data

[62] Division of Ser. No. 198,282, Nov. 12, 1971, abandoned.

[51] Int. Cl.² ............................................. B32B 31/00
[52] U.S. Cl. ................................. 156/250; 156/498; 156/306
[58] Field of Search ............... 156/251, 250, 306, 515, 156/583, 498

[56] References Cited

U.S. PATENT DOCUMENTS

| | | | |
|---|---|---|---|
| 2,882,956 | 4/1956 | Weist | 156/353 |
| 2,947,345 | 8/1960 | Schjeldahl | 156/361 |
| 3,043,729 | 7/1962 | Seiden | 156/510 |
| 3,060,075 | 10/1962 | Kincaid | 156/510 |
| 3,162,564 | 12/1964 | Buchner | 156/498 |
| 3,483,061 | 12/1969 | Takahashi et al. | 156/510 |

Primary Examiner—Douglas J. Drummond
Attorney, Agent, or Firm—F. W. Anderson; C. E. Tripp

[57] ABSTRACT

According to the present disclosure a method is provided wherein tubular thermoplastic material is intermittently fed between opposed transversely extending seal bars operating in timed relation with the intermittent feeding of the web to sequentially perform cutting and sealing of the web during its period of repose. To insure a clean straight transverse cut, which occurs momentarily before transverse sealing, the web is held under tension between longitudinally spaced draw and feed rolls. Immediately after the web is transversely severed, the seal bars are brought into pressure engagement transversely sealing the web along a margin which will define the bottom of the bag. While the sealed portion of the web is at the sealing station, cooling air is discharged along the sealed portion of the web to effect cooling. Before the web is fed an additional increment, it is momentarily fed rearwardly to avoid the possibility of adherence to the seal bars.

5 Claims, 12 Drawing Figures

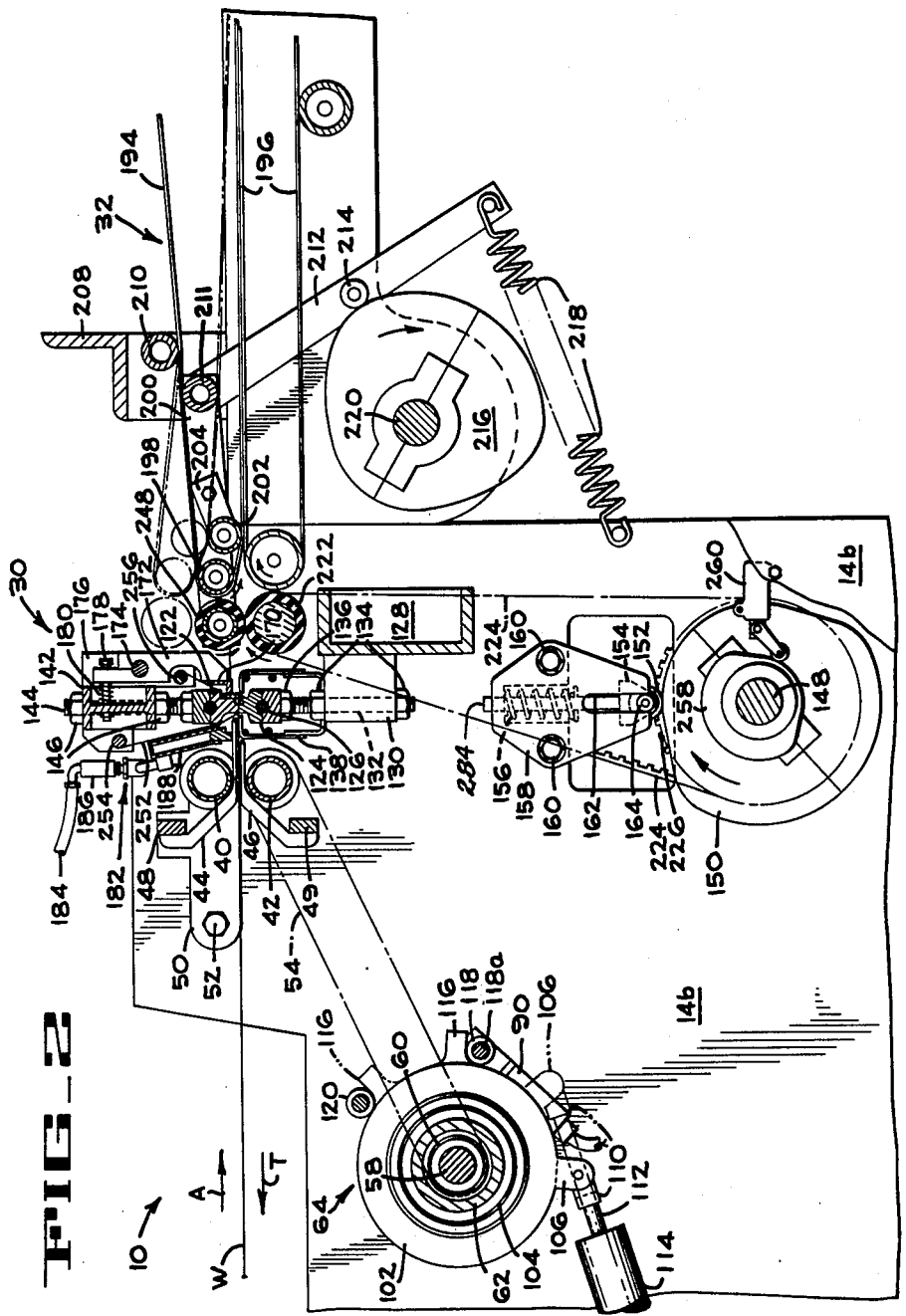
FIG_2

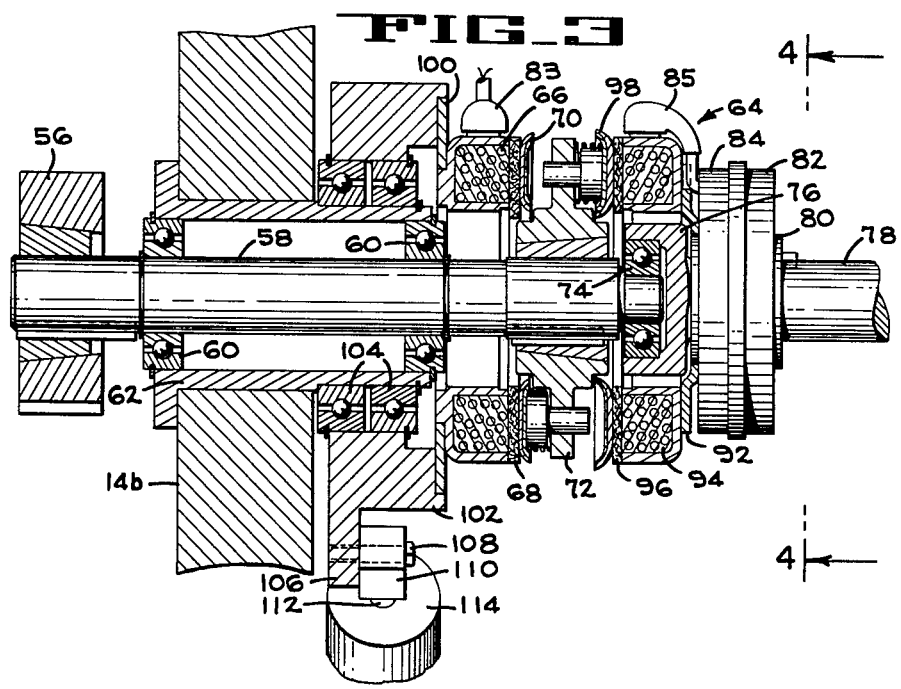
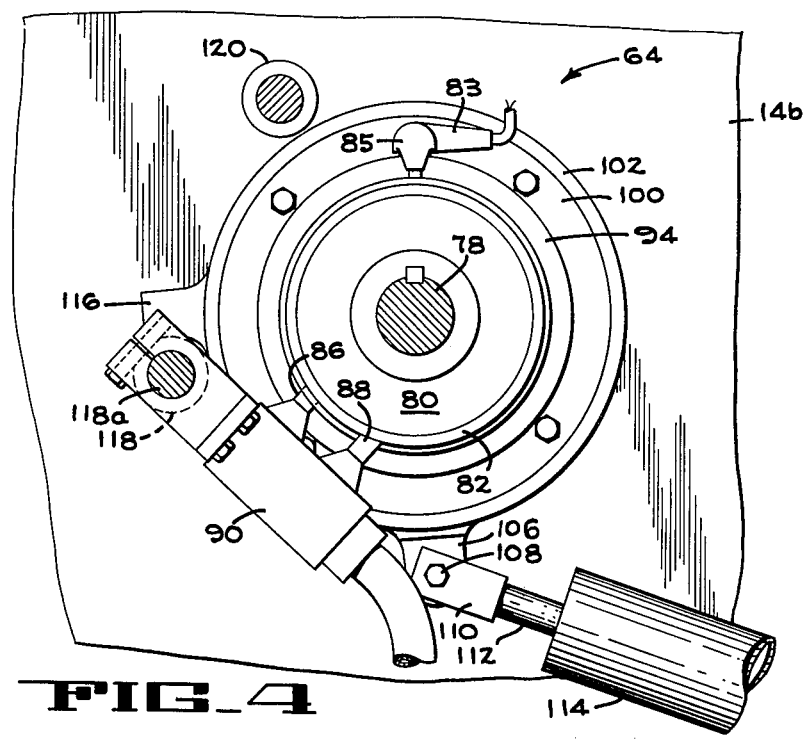

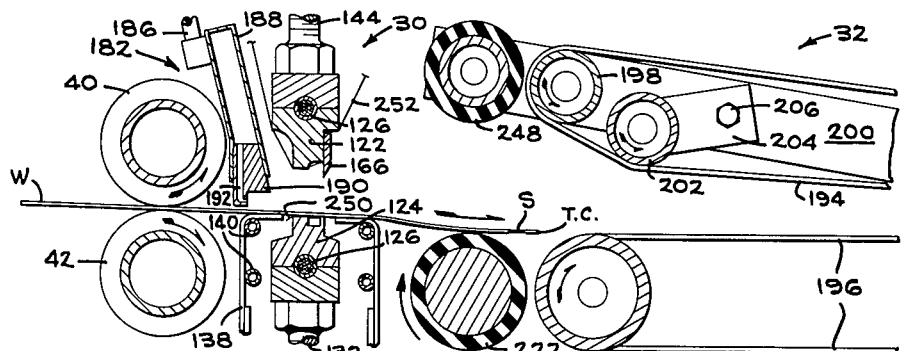
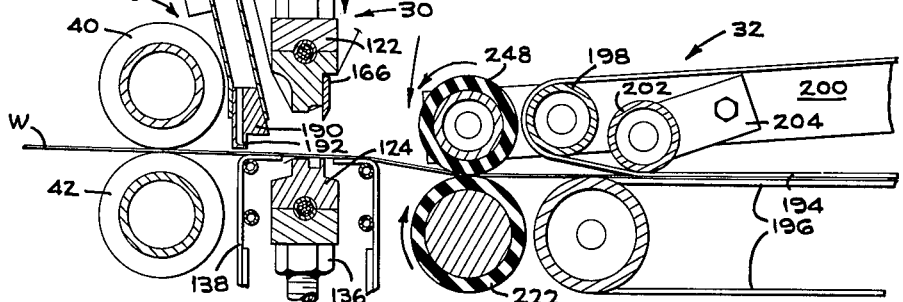
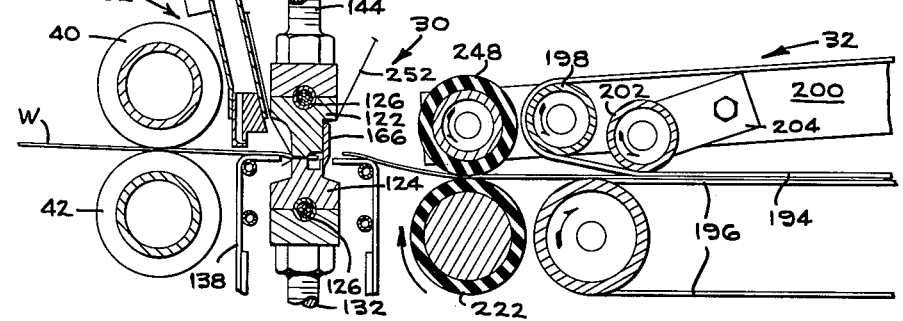
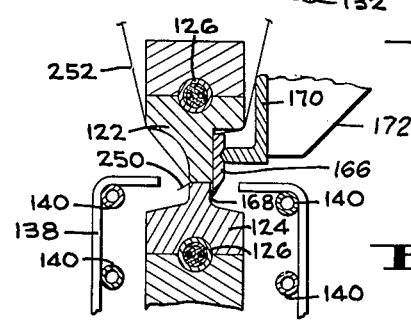

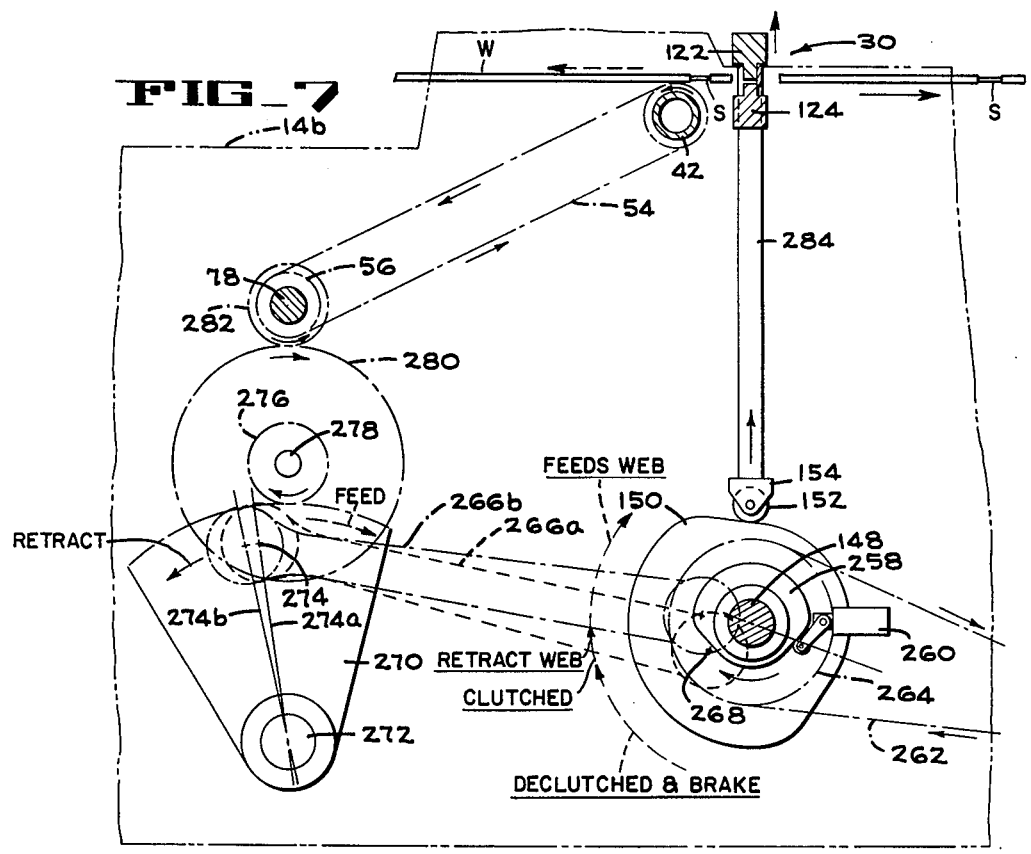
FIG_7
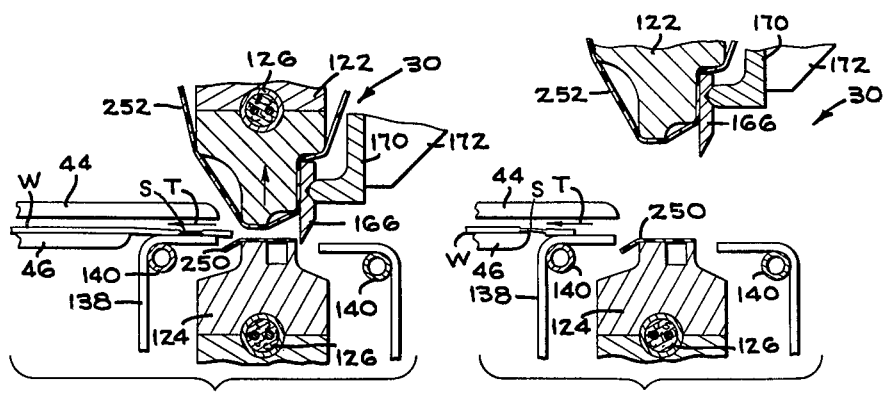
FIG_8  FIG_9

METHOD OF MAKING BOTTOM SEAL THERMOPLASTIC BAGS

This is a division, of application Ser. No. 198,282, filed Nov. 12, 1971, now abandoned.

BACKGROUND OF THE INVENTION

Bag machines for making bags from thermoplastic web material can be arranged to make side weld or bottom weld bags. Side weld bags are made by unwinding a roll of thermoplastic material and folding it along or adjacent its longitudinal median. The folded web is fed stepwise over an intermittently rotating platen roll providing support for a transverse band of the web. Over the platen roll, a transversely extending reciprocably mounted seal bar is provided that engages the web effecting sealing and severance thereof when it comes into pressure engagement with the platen roll. As the seal bar is moved vertically upwardly, the platen roll is immediately rotated at a surface speed greater than the initial speed of the web in order to overcome the tendency of the web, which has been rendered molten while it is in contact with the platen roll, to stick to the platen roll. As will be pointed out hereinafter, bag machines set up to produce bottom weld bags exhibit the same tendency but until the advent of the present invention no satisfactory means were available to reliably insure stripping of the web to prevent adhesion with the seal bars.

Bottom weld bags are made by supplying the thermoplastic film in tubular form, whether it be gusseted or non-gusseted. Some machinery is provided with sealing and cutting bars operating to transversely cut and seal the web at longitudinally spaced intervals so that the mouth of the bag is the portion which is initially fed to stacker belts, which are designed to transport the completed bag to a stacking table. The disadvantages of having the mouth of the bag leading into the stacker belts has been recognized and its main deficiency is that the bag has a tendency to inflate due to the rapid movement of the film from the seal bar area to the stacker belts. Some machines which are presently available cut and seal the film so that the bag bottom is fed first into the stacker belts avoiding or completely eliminating the possibility of inflating the bag.

Bag machines, whether they are producing side weld or bottom weld bags, require for commercial acceptability the ability to stack bags in a neat pile wherein the margins of the bags are vertically aligned much like a deck of cards. Among the many elements that contribute to this result, bag pick-off accuracy and transportation of the individual bags by the stacking conveyor are major factors. As will be pointed out hereinafter, the subject matter of the invention provides an apparatus and method that will reliably and consistently transport and stack bags in a registered pile.

Production of bottom weld bags necessitates transverse cutting of the web adjacent the bottom seal. It is usual practice to cut the web from one-eighth to five-sixteenths of an inch from the weld producing, what is commonly known in the industry, a skirt. To perform the cutting, known prior art devices comprise a series of thin knives such as razor blades mounted on a rigid bar to define a saw-tooth configuration. Problems with this arrangement continually arise occasioned by bending of the knives resulting in uncut portions of the web which effect the orientation of the bag as it is received and transported by the stacker belts. The invention provides a remedy for this condition as the means employed for transversely cutting the web include a continuous rigid cutting blade not subjected to deformation or bending.

SUMMARY OF THE INVENTION

According to the present invention, a seal bar structure including a lower stationary platen and an upper cooperating reciprocable platen are provided to produce the transverse seal. Associated with one of the platens preferably the upper platen is a cutter bar which is arranged to cut the tubular web immediately before the platens come in contact to make the seal.

Since the thermoplastic web is substantially completely lacking in stiffness, the web feeding and bag delivery systems are coordinated to tension that portion of the web which will be sealed and severed. In particular, this result is achieved by applying torque to rubber covered pick-off rolls which continually urge the web toward the stacker section but movement of the web is prevented by the web draw rolls since they are at rest at this time. Thus, tension is applied to the web between the draw rolls and the pick-oof rolls. Tensioning the web enables the production of a clean and accurate cut-off. The completed bag is immediately transported by the pick-off rolls and the associated stacker belts to the stacking table without resulting in disorientation of the bags.

Further according to the present invention means is provided to produce a skirtless bottom seal bag or a bag having a skirt with from one-eighth to five-sixteenths of an inch. By providing the capability of producing bags without a skirt, significant savings in web material is realized without reducing the capacity of the bag. In the industry, one of the dimensions specifying bag sizes extends from the mouth of the bag to the seal. Thus, whether the bag is produced with a skirt or without a skirt does not influence bag size specifications. However, at the present time, as a matter of customer acceptability, it is preferable to make bottom weld bags with a skirt although the provision of a skirt does not add to the strength or size of the bag. To make a bottom weld bag without a skirt, the web engaging surfaces of the upper and lower seal bars are continuous in the direction of web feed and the cut-off knife is located to sever the web adjacent the margin of the line seal.

Further in accordance with the present invention a method is provided that prevents adherence of the thermoplastic web material to the seal bars. While the seal bars of the present invention are provided with the usual Teflon-impregnated glass cloth which at the present state of the art exhibits the best release tendencies, the problem still remains, particularly in producing bottom weld bags. The solution proposed by the present invention involves a slight retraction of the web material from the seal bar area positively stripping or breaking the heated portion of the web from the seal bars before feeding the web the desired distance to produce a bag of required length.

It is further proposed by the present invention to withdraw the thermoplastic web from the seal bar area whenever normal machine operation is interrupted or the machine is shut-down. The approach preferred by the present invention to fulfill this objective is to provide means responsive to the condition of the control circuit, that is in the event the stop button of the machine is depressed interrupting machine operation, to rotate the clutch brake housing through a selected arc which in turn reverses the draw rolls withdrawing the end of the web from the seal bar area and thus prevent distortion or damage to the leading portion of the web due to the heat radiated by the seal bars.

Further in accordance with the present invention cooling means are provided in the seal bar area for cooling the heat sealed portion of the web. Providing such means insures a proper cooled seal when the bag is discharged to the stacking table thus preventing the tendency of the bags to adhere to each other which is a problem encountered in the manufacture of thermoplastic bags. The cooling means of the present invention also function to maintain the web in its plane of travel and to shield the rubber covered feed rolls from the heat radiated by the seal bars.

BRIEF DESCRIPTION OF THE DRAWINGS

FIG. 2 is an enlarged partial longitudinal section showing a portion of the web feed system, the web sealing and cutting apparatus and the bag transport system, FIG. 3 is a further enlarged partial axial section of the clutch brake which sequentially connects and disconnects web drive system from the main drive of the bag machine, FIG. 4 is a transverse section of FIG. 3 taken substantially along the line 4—4, FIGS. 5A, 5B and 5C illustrate the sequence of operation of the seal bar and the pick-off rolls, FIG. 6 shows a modified form of the seal bars when it is desired to produce skirtless bags, FIG. 7 is a diagrammatic view of a portion of the web drive system which cyclically retracts the web stripping it from the seal bars, FIG. 8 is a greatly enlarged fragmentary section of the seal bar area showing the leading edge of the web retracted, FIG. 9 is similar to FIG. 8 showing however the relative degree of web retraction when bag making is interrupted.

DESCRIPTION OF THE PREFERRED EMBODIMENT

Figure 1:
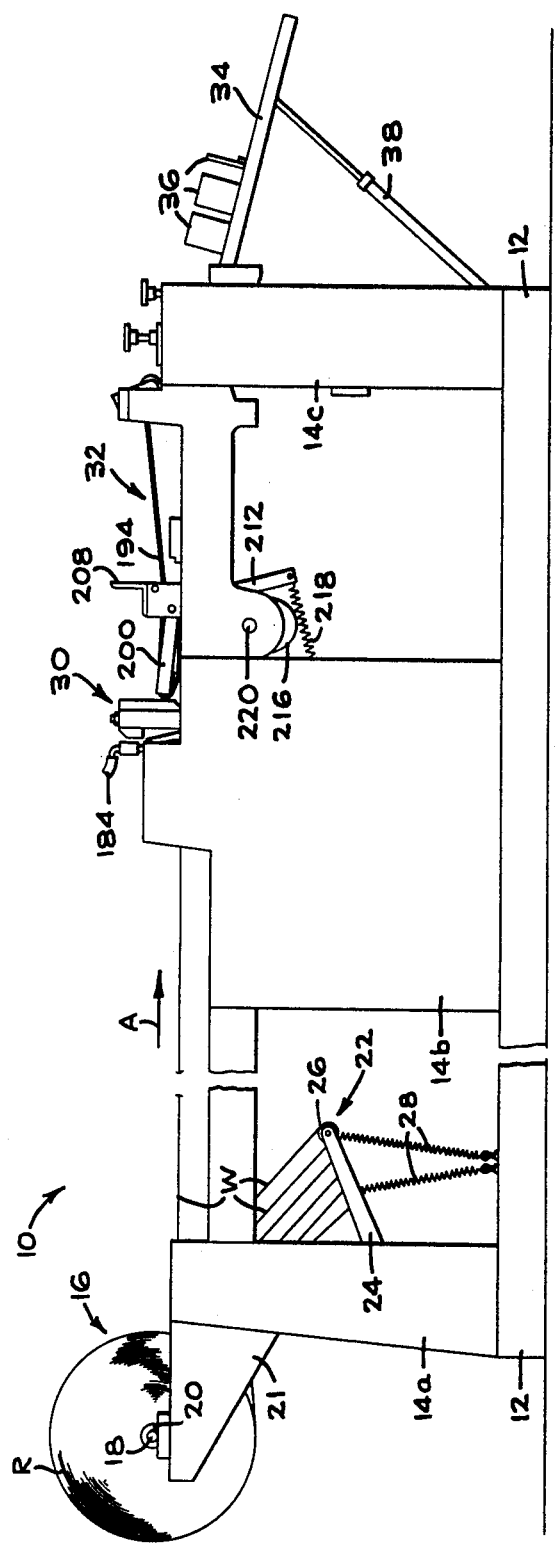
FIG. 1 is a side elevation of the bag machine incorporating the features of the present invention.

A bag machine incorporating the principles of this invention is shown in FIG. 1 and it is generally identified by the numeral 10. The bag machine of the illustrated type is shown in greater detail in the application of Wech, Ser. No. 760,048 filed Sept. 16, 1968 an issued May 16, 1972 as U.S. Pat. No. 3,663,338 which is assigned to the assignee of the present invention and it is intended that its disclosure be incorporated herein by reference. The bag machine 10 comprises a base plate 12 supporting a plurality of upwardly extending generally laterally aligned side frame members 14a, 14b and 14c. The major components of the bag machine include a web supporting and unwind apparatus 16 including a shaft 18 rotatably supported in bearings 20 rigidly mounted on laterally aligned rearwardly extending plates 21. The supply of thermoplastic web material, sometimes hereinafter referred to as a web roll, is indicated by the letter R and for purposes of the present disclosure the web roll is supplied in tubular form, in the art, usually referred to as, tubular stock. As web W is unwound from the web roll R it traverses a web tension control system 22 including dancer arms 24 interconnected by a series of idle rolls, one of which is indicated by numeral 26. Respective end portions (not shown) of the dancer arms 26 are pivotally mounted to the laterally aligned pair of side frame members 14a and are biased downwardly by springs 28 which impart a predetermined tension to the web W.

The web is fed in the direction of the arrow A to a sealing and cutting station 30. As shown and described in the above-mentioned application, the web drive is arranged to feed the web a selected amount depending on the bag length, when tubular stock is being processed, and a selected amount determined by the width of the bag desired, when flat folded web is being processed. After the desired amount of web has been advanced, movement of the web is arrested to permit the sealing and cutting devices located at station 30 to transversely sever and seal the web along a transverse line located under the seal bar. Because the web is intermittently fed the dancer arms 24 of the web tension control 22 oscillate during each cycle of machine operation in order to maintain a desired amount of tension to the web.

After the web has been transversely severed and sealed, the bag produced thereby is transported by a stacking conveyor 32 to a stacking table 34 having a plurality of fences 36 serving to constrain the bags to define a neatly registered pile. The stacking table 34 is supported on the frame of the bag machine by struts 38.

Some of the elements involves for intermittently feeding, sealing and transporting the bags to the stacking table are shown in enlarged-detail in FIG. 2. The web W is received between a pair of draw rolls 40 and 42, the upper and lower draw roll, respectively. The draws rolls are provided with a rubber covering which, at axially spaced intervals, is slotted to receive stripper fingers 44 and 46 that are rigidly mounted, respectively, on transverse bars 48 and 49. The bar 49 is carried by the side frames 14b. The stripper fingers serve to provide longitudinal and lateral support to the web as it is fed to the cutting and sealing station 30.

As shown and described in the above-referred to application, the upper draw roll 40 is rotatably mounted in links 50 which are pivotally mounted at 52 to the opposed side frame members 14b. In addition the bar 48 has its ends attached to the links 50. The draw roll 40 is held in pressure engagement with the draw roll 42 by fluid actuators (not shown) connected to effect pivotal movement of the links 50 during normal operation of the bag machine. In the event bag machine operation is interrupted for an extended period of time or completely shutdown, the fluid actuators pivot the links 50 to release the nip pressure between the draw rolls 40 and 42. By this arrangement flat spotting or setting of the rubber-covered draw rolls 40 and 42 is prevented.

Intermittent rotation is supplied to the lower draw roll 42 by a chain or timing belt 54 trained about a pulley 56 which is keyed to a shaft 58 (FIG. 3) rotatably mounted in bearings 60 carried by a tubular sleeve 62. The sleeve 62 is mounted in one of the side frames 14b.

The shaft 58, which drives the lower draw roll 42 through the pulley 56 and the timing belt 54, is intermittently rotated to thereby feed and arrest movement of the web. To accomplish such intermittent feeding the shaft 58 is associated with a clutch-brake 64. A clutch-brake found suitable is Model 500 made by Warner Electric. While the clutch-brake details are not critical to the present invention, a brief description thereof will assist in understanding some aspects of this disclosure. The clutch-brake 64 includes a brake coil 66 provided with a friction disc 68 which is alternately forceably engaged by a series of circumferentially disposed shoes 70 reciprocably carried in an armature hub 72. The armature hub is keyed to the shaft 58 which has one of its ends rotatably mounted by a bearing 74 in a bell housing 76 formed in the end of a continually oscillating input shaft 78 which is oscillated in opposite directions by the mechanism of FIG. 7, to be described. On the shaft 78 there is keyed a hub 80 provided with slip rings 82 and 84 in slidable contact, respectively, with brushes 86 and 88 carried by a holder 90. Rigidly attached to the shaft 78 by an annular bracket 92 is a clutch coil 94 also carrying a friction disc member 96 engaged by a plurality of shoes 98 that forceably engage the friction disc 96 when the coil 94 is energized. Electrical connections 83 and 85 complete the circuit to brake coil 66 and clutch coil 94.

The brake coil 66 is attached to a radially extending flange 100 rigidly secured to a ring 102, rotatably mounted by bearings 104, to the tubular sleeve 62. The ring 102 is formed with a lug 106 in which is threaded a bolt 108 providing a pivot for a block 110 secured to the rod 112 of a linear actuator or cylinder 114. Provisions of the ring 102 secured to the brake coil 66 is for the purpose of retracting the leading edge of the film a sufficient distance from the sealing and cutting station whenever the machine is stopped in order to prevent heat damage and consequent distortion to the web edge. The particular manner in which this occurs will be explained in greater detail hereinafter.

The actuator 114 is retracted or extended in response to whether the machine is operating to produce bags or is stopped. When the stop button (not shown) on the electrical control circuit is depressed, disconnecting the main drive motor from the line, a time delay relay (not shown) is energized and times out. A solenoid valve (not shown) is then actuated extending the rod 112 of the cylinder 114. Concurrently therewith the brake coil 66 is energized and clutch coil 94 de-energized interrupting the driving connection between the shaft 78, which is continually oscillating, and the shaft 58, which as mentioned previously imparts rotation to the draw rolls 40 and 42. Since the ring 102 is rigidly connected to the brake coil 66, extension of the actuator 114 causes rotation of the shaft 58 and such rotation is limited to approximately 40° by means which will be presently described. The purpose in providing such a limited rotation to the shaft 58 is to prevent heat damage by the sealing and cutting means 30 to the leading portion of the web whenever machine operation is interrupted for one or more bag machine cycles.

As shown in FIG. 4, the ring 102 is formed with a radially extending dog 116 whose arc of rotation is determined by stop buttons 118 and 120 which are rigidly secured to the side frame 14b. It should also be noted that the brush holder 90 is secured to a stub shaft 118a that mounts the stop button 118. The stub shaft 118a is a short cantilevered shaft extending from the side frame 14b to the hub 80 in order to position the brushes 86 and 88 in contact with the slip rings 82 and 84.

Referring to FIG. 2, it will be observed that the actuator 114 is shown in its retracted position firmly engaging the dog 116 with the button 118. Extending the actuator projects the rod 112 rotating the ring 102 to bring the dog 116 in abutting engagement with the button 120. This condition is shown in phantom outline. Concurrently the lower draw roll 42 is rotated by virtue of the rotation of the timing belt 54 by the pulley 56. Since the draw roll 40 is in pressure engagement with the draw roll 42, both draw rolls are simultaneously rotated thus effecting retraction of the film rearwardly in the direction of the arrow T away from the severing and sealing station 30 thus avoiding the possibility of any film damage occasioned by the heat radiated by the seal bars when the machine is stopped for one or more bag making cycles.

In accordance with another feature of the present invention the sealing and severing station 30 is provided with cooperating seal bars and a knife associated with one of the seal bars for cutting the web material adjacent one margin of the seal in order to produce skirtless bottom seal bags. As a result of this feature, it is also possible to produce bags having a desired skirt width. Referring now to FIG. 2 it will be observed that the sealing and severing station 30 comprises an upper seal bar 122 extending transversely and located between the side frame members 14b. The upper seal bar cooperates with a lower seal bar 124. Each of the seal bars is provided with a tubular heating element 126 which is associated with the appropriate temperature controls to heat and maintain the seal bars at a desired temperature.

The lower seal bar is supported by a transverse channel 128 having each end rigidly secured to the side frames 14b. Transversely spaced along the channel and rigidly connected thereto are a plurality of brackets 130 (only one of which is shown in FIG. 2) which are bored to receive a threaded stud 132 which can be vertically adjusted by manipulating nuts 134. One end of the stud 132 is threadedly received in the lower seal bar 124 and locked in position by a nut 136. By this construction the lower seal bar can be adjusted to assume the appropriate elevation relative to the film line and also to be located parallel with the film path.

The lower seal bar 124 is also associated with a shield 138 including a plurality of conduits 140 (FIG. 6) through which flows a cooling fluid, whether gaseous or liquid, to prevent the propagation of radiant heat to the draw rolls and rolls associated with the stacking conveyor 32.

In substantially similar respects the upper seal bar 122 is connected to a reciprocating I beam 142 by a series of laterally spaced threaded studs 144 extending through the I beam and threadedly attached to its upper segment. Adjustment of the upper seal bar to align it with the lower seal bar is effected by nuts 146. As will be made evident with respect to the showing of FIG. 7, each end of the I beam 142 is rigidly connected to push rods 284 for reciprocating the upper seal bar 122 in timed relation with the intermittent feeding of the web such that when the web is at rest the seal bar is brought downwardly in firm engagement with the lower seal bar 124 in order to sever and seal the web.

A portion of the drive for the upper seal bar is shown in FIG. 2 and it comprises a transverse shaft 148 rotatably supported by the side frames 14b and having secured thereto cams 150 (only one being shown in FIG. 2). The surface of the cams 150 are rollingly engaged by a roller 152 which is mounted for rotation in a clevis 154 rigidly attached to the lower end of each push rod 284 (FIG. 7). To maintain the roller 152 in continual contact with the surface of the cam 150 a spring 156 (FIG. 2), mounted in a bracket 158 is provided. As illustrated, the bracket 158 is rigidly secured to the side frames 14b by bolts 160. Each of the brackets 158 is provided with a vertical slot 162 in which is slidably movable a guide pin 164 which is rigidly connected to the clevis 154 and serves to constrain the seal bar actuating push rods 284 to be maintained in a rectilinear path and to prevent any tendency of the rod to rotate about its longitudinal axis.

Figure 10:
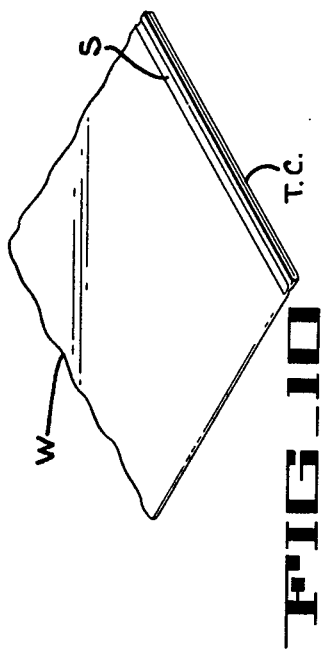
FIG. 10 is a fragmentary portion of the sealed end of a bottom weld bag.

FIG. 10 shows a typical portion of a bottom weld bag having a skirt. The transverse line seal is designated by the letter S and transverse cut line by T.C. The cut line T.C. is accomplished by providing a one piece knife blade 166 seated in firm contact with an undercut portion of the upper seal bar 122. As shown in FIG. 6, the lower seal bar 124 is formed with a vertical face 168 which is located in the same vertical plane as the sharpened edge of the knife 166. As shown in FIGS. 5A, 5B and 5C, the cutting edge of the knife 166 is below the sealing face of the upper seal bar 122 thus when the upper seal bar 122 approaches the lower seal bar 124 the web is severed by the knife 166 cooperating with the surface 168 and immediately thereafter the seal bars are brought into pressure engagement to produce the seal.

The knife 166 is firmly held in the undercut portion of the upper seal bar 122 by a spring urged angle member 170 which is best shown in FIG. 6. At laterally spaced intervals the angle member 170 is rigidly attached to fingers 172 (FIG. 2) pivotally mounted on a transverse shaft 174 the ends of which are carried by plates 176. The plates 176 are secured in any suitable manner to the ends of the I beam 142. Each of the fingers 172 is resiliently attached to the vertical web of the I beam 142 by a bolt 178 over which is disposed a compression spring 180 serving to bias or urge the fingers 172 in forceful engagement with the angle member 170 to thereby retain the knife seated against the upper seal bar 122.

By clamping the knife 166 in the above described manner it is free to expand and contract without distorting and its replacement or removal for maintenance merely involves slightly rotating the fingers 172 about the shaft 174.

In accordance with another feature of the present invention a protective heat barrier is provided between the upper draw roll and the upper seal bar which in addition serves to cool the seal and assist in maintaining the web in the desired feed plane. Referring first to FIG. 2 it will be observed that the cooling means, generally indicated by the numeral 182, comprises a conduit 184, connected to any suitable source of compressed air. The conduit is attached to flow control valve 186 in communication with an elongate generally rectangular chamber 188. With reference to FIG. 5A, which shows the cooling means 182 in greater detail, it will be seen that the chamber 188 is defined in part by an elongate block 190 including a plurality of passageways 192 that discharge compressed air over the web in the normal direction of movement of the web and generally parallel thereto in and beyond the area of the seal bars. As mentioned above not only does the air serve to cool the seal but it influences the web to maintain its predetermined path into the stacking conveyor 32.

The stacking conveyor 32 of the present invention is uniquely associated with sealing and cutting station 30 to fulfill two main requirements which are to assist in producing a clean cut-off to the web by the knife 166 and to transport the completed bag without disorientation in order to provide accurate stacking. To achieve the first mentioned objective the stacking conveyor 32 imposes a tension on the web so that it is rendered taut before the knife 166 comes in shearing engagement with the web. The added stiffness assists the cutting action and prevents the possibility of welding the web plies along the mouth of the bag.

The stacking conveyor of the present invention is, in substantial respects, similar to the one disclosed in application Ser. No. 760,048 now Wech U.S. Pat. No. 3,663,338. The stacking conveyor of the present invention includes the usual sets of upper and lower transport belts 194 and 196, respectively. The upper belts 194 are trained about an idle roll 198 each end of which is rotatably mounted on pick off arms 200, only one of which is shown in FIG. 2. While this application discloses details of the machine in longitudinal section, it is to be understood that some of the parts, such as the pick off arms 200, shown in FIG. 2 are duplicated on the other side of the machine. Associated with each pick off arm 200 is an adjustable nip roller 202 mounted on a bracket 204 which in turn is bolted to the arms 200 by a bolt 206. Extending transversely and overlying the stacker 32 is a frame structure 208 supporting a pick off pivot shaft 211 and idler roll 210.

The pick off arms 200 are rigidly connected to a link 212 provided with a cam follower roller 214 held in rolling engagement with the surface of the cam 216 by a spring 218. The cam 216 is of split design to facilitate synchronization and replacement when the machine is set up to produce side weld bags. The cam 216 is rigidly attached to a shaft 220 that rotates in the direction of the arrow. Rotation of the cam oscillates the link 212 which in turn raises and lowers the pick off arms 200 from the full line position to the phantom line position shown in FIG. 2. The cam 216 synchronizes the action of the pick off arms 200 so that they are raised when the draw rolls 40 and 42 index the web a distance equal to one bag length. After the draw rolls have been stopped the pick off arms are moved downwardly to the full outline position as shown in FIG. 2 and maintain that position through high dwell of cam 216.

In order to apply tension to the web a lower rubber covered roll 222 is provided that is driven by a belt 224, which, in turn, is driven by a pulley 226 mounted on a shaft 148. The roll 222 is continually rotated by the belt 224.

At the end of the pick off arm 200 a rubber roll 248 is rotatably mounted and it makes firm contact with the rubber roll 222 when the pick off arms 200 are lowered. Since the width of the web is usually substantially less than the width of the machine, portions of the rolls 222 and 248 are in direct rolling contact thus permitting the lower driven roll 222 to impart torque to the upper roll 248.

The operative sequence of the stacking conveyor and the sealing and cutting station 30 are shown in FIGS. 5A, 5B and 5C. In FIG. 5A the condition is shown whereby the leading edge of the web is being fed by the draw rolls 40 and 42. At this time the seal bar 122 is in its upper position and the pick off arms 200 are raised to provide separation between the belts 194 and 196 to allow entrance of the leading edge of the web therebetween. After the web has been advanced the desired amount the draw rolls 40 and 42 are stopped and the pick off arms 200 are lowered bringing the stacker belts 194 in firm contact with the stacker belts 196. Further the roll 248 is in pressure engagement with the lower driven roll 222 tensioning that portion of the web between the nip of the draw rolls 40 and 42 and the rolls 248 and 222. While the web is held in this condition, that is the condition of tension as shown in FIG. 5B, the seal bar 122 is moved downwardly toward the seal bar 124. Since the cutting edge of the knife 166 is in advance of the face of the seal bar 122 it makes contact with the web effecting its severance, as shown in FIG. 5C, before the web is sealed. Immediately after the web is severed the rolls 222 and 248, together with the belts 194 and 196 transport the completed bag to the stacking table 34.

The seal bars shown in FIGS. 5A, 5B and 5C are formed to provide a bag with a skirt, an exemplary portion of which is shown in FIG. 10. In the event it is desired to provide a skirtless bag the seal bars take the general form shown in FIG. 6 wherein the sealing surfaces of the seal bars 122 and 124 take a planar configuration up to the cutting edge of the knife 166.

As is usual in the prior art the present invention provides Teflon-impregnated glass cloth for the upper and lower seal bar. With respect to the lower seal bar a strip of glass cloth 250 is adhesively applied thereto while the upper seal bar is provided with a curtain 252 extending from a storage rod 256 to a take up rod 254 (see FIG. 2). As is known to those skilled in the art, Teflon-impregnated glass cloth serves the purpose of avoiding sticking of the thermoplastic web to the seal bars. In the event sticking tendencies are revealed the upper Teflon curtain can be transported a sufficient amount to present or locate an unused portion adjacent the sealing face of the upper seal bar 122. To accomplish this the fingers 172 are released slightly withdrawing the knife 166 which will free the Teflon curtain so that it can be wound on the take up rod 254 while it is unwound from the rod 256. After transporting the curtain a desired amount the fingers 172 can be reset to forceably retain the cutting knife 166 in the recess provided in the upper seal bar 122.

In recognition of the difficulty encountered in preventing sticking of the thermoplastic web to the seal bars, which is a problem particularly acute in the manufacture of bottom weld bags, the present invention makes provision to reliably prevent this occurrence. Total reliance on Teflon-impregnated glass cloth has not proven to be practical. In response to these problems the present invention proposes to withdraw the web from the seal bar area in a direction in opposition to web feed in order to strip the web from the seal bars in the event sticking occurs.

It will be recalled that upon machine shutdown or when machine operation is interrupted for more than one bag making cycle, the cylinder 114 (FIGS. 2 and 4) is extended rotating the ring 102 until the dog 116 makes engagement with the button 120. This effects ring rotation reversal of the lower draw roll 42 retracting the film a substantial distance from the seal bar zone. The approximate extent of retraction is shown in FIG. 9.

However, to reliably prevent sticking of the film during normal machine operation the present invention provides the arrangement shown in FIG. 7. It is to be understood that only those portions of the drive are shown which are relevant to describe the web stripping feature of the present invention however the entire drive of the bag machine is shown in application Ser. No. 760,048, now Wech U.S. Pat. No. 3,663,338. Referring now to FIG. 7, it will be observed that on the shaft 148 a cam 258 is secured for operating a limit switch 260 which is electrically connected for operating the clutch-brake 64. Such operation is known and is disclosed in FIG. 7 of Crawford et al U.S. Pat. No. 3,541,929 which issued on Nov. 24, 1970. The main motor of the bag machine (not shown) drives a belt 262 which is trained about a pulley 264 also keyed to the shaft 148. By means of a connecting rod 266, rotatably mounted on a crank pin whose center is schematically shown and identified as 268, rotation of the shaft 148 causes oscillation of a segment gear 270. The segment gear is rotatably mounted on a shaft 272. The connecting rod 266 is journalled on a pin rigidly connected to the segment gear 270 having its center at 274. The crank pin whose center has been illustrated at 268 is mounted so that its distance from the center of the shaft 148 can be varied in order to increase or decrease the amplitude or throw of the segment gear 270. Details of this construction are shown in Wech U.S. Pat. No. 3,663,338 (FIGS. 16 and 17, and in the art such a mechanism is commonly referred to as a web development change device or a draw length adjuster.

The segment gear 270 is in mesh with a small spur gear 276 keyed to a shaft 278 which has also keyed thereon a large gear 280. The gear 280 meshes with a gear 282 which is keyed to the shaft 78 (FIG. 3). Accordingly, whenever the shaft 148 is rotating the segment gear 270 is oscillated, which by virtue of the gears 276 and 280, imparts clockwise (feed) and counterclockwise (reverse) rotation to the shaft 78 by the gear 282 which is in mesh with the gear 280. The extent of such clockwise and counterclockwise rotation of the shaft 78 depends upon the radial distance of a crank pin center 268 from the center of the shaft 148. As seen in FIG. 7, since the inner end of the connecting rod 266 is mounted on a crank pin having a center 268 that is offset from the center of the motor driven shaft action on the crank pin 266 is that of a crank, corresponding to the plate 330 shown in FIG. 16 of the aforesaid Wech patent. Since the outer end 274 of the connecting rod 266 is journalled to the segment gear 270 the crank action on the inner end 268 causes the outer end 274 and the segment gear 270 to oscillate in the direction of the connecting rod axis at a velocity which at any instant varies as the sine of the angle of the crank from its two dead center positions.

The position of center 274 of the connecting rod at position 266b is one limit of the travel of center 274 and hence represents the left dead center position at which postion the crank angle can be considered to be either 0° or 180°, but applicant prefers to assign the value of 0° to the left dead center position. Of course the right dead center position (not illustrated) would represent a crank angle of 180°.

Thus the drive for draw roll shaft 75, which includes oscillating shaft 58 (FIG. 3), the crank pin center 274 (FIG. 7), segment gear 270, gears 226, 280 and 282 provides a web feed stroke in one direction and a reverse stroke in the opposite direction and these strokes progressively increase and decrease in velocity from zero velocity to a maximum velocity and back to zero velocity between reversals of stroke direction.

Also shown in FIG. 7 is one of the push rods identified as 284 operating to raise and lower the upper seal bar 122 in response to the rotation of the shaft 148 which carries the cam 150 as previously described. It is to be understood that a push rod 284 is associated with each end of the upper weld or seal bar 122 and operates in synchronism to raise and lower the seal bar in timed relation with the intermittent motion of the web.

It is to be recalled that the shaft 148 includes two laterally spaced cams 150 each operating a push rod 284 to effect reciprocation of the upper seal bar 122 although one cam and one push rod are shown in FIG. 7. When the cam 150 commences displacing the push rod 284 upwardly, the condition shown in FIG. 7, the switch 260 is actuated to deenergize the brake coil 66 and energize the clutch coil 94 (FIG. 3). At that instant the connecting link rod 266 is in the position shown by the dotted line position 266a and the center 274 is on the line 274a. At the position 266a the connecting rod 266 has almost reached its left dead center position 226b, which represents the end of the counterclockwise (reverse or retract) stroke of the segment gear 270. Thus, since the inner end 268 of the connecting rod is driven by rotary motion of the shaft 148 the velocity of the outer end 274 and of the segment gear 270 at connecting rod position 266a is approaching zero. Since the segment gear 270 is being moved counterclockwise, as viewed in FIG. 7, the shaft 78 is also rotated in a counterclockwise (reverse) direction and by virtue of the energization of the clutch, the shaft 58 is rotated in the same direction, moving the timing belt 54 in the direction indicated by the arrows. The lower draw roll 42 is accordingly rotated momentarily in a counterclockwise (reverse) direction (FIG. 7) retracting the web W from the lateral zone of the seal bars as the seal bars are separated. An exemplary degree of such retraction is shown in FIG. 8 where it will be observed that the direction of film movement is indicated by the arrow T and the movement of the upper seal bar 122 is upwardly. Thus, in the event the film exhibits tendency to adhere to the lower or upper seal bar, its retraction positively strips the film from the seal bars.

When the connecting rod 266 assumes the dead center position indicated by 266b the center 274 is on the line 274b, which would be one limit of its travel. Thereafter the segment gear 270 is rotated in a clockwise direction feeding the film an amount determined by the distance between the center 268 and the center of the shaft 148. It will be noted that the switch 260 maintains the clutch energized for approximately 180 degrees of rotation of the shaft 148 whereupon it is actuated to deenergize the clutch and actuate the brake stopping the web. When the web is at rest, the cam 150 allows the push rods 284 and of course the seal bar 122 to lower and operate to sever and seal the film as described above.

Although the best mode contemplated for carrying out the present invention has been herein shown and described, it will be apparent that modification and variation may be made without departing from what is regarded to be the subject matter of the invention.

What is claimed is:

1. In a method making bottom weld bags from a supply of elongate thin, flexible multi-layer web of thermoplastic material, which comprises the steps of converting normally continuously rotary motion to oscillatory motion for providing an oscillating drive having a web feed stroke in one direction and a reverse stroke in the opposite direction with said strokes progressively increasing and then decreasing in velocity from zero velocity to a maximum velocity and back to zero velocity between reversals of stroke direction, gripping the web between rotatable draw rolls and maintaining the grip of said rolls on the web during both of said strokes, separating transversely disposed seal bars and clutching a draw roll to the oscillating drive during the latter's feed stroke for drawing a trailing length of the web from the supply while advancing a leading edge of the web for motion between and past the seal bars, declutching said draw roll from the drive and preventing web motion at the end of the feed stroke, severing the web downstream of the seal bars and bringing the seal bars together for making a weld at the leading edge of the severed web, separating the seal bars and feeding a new length of web between the separated seal bars; the improvement comprising the steps of freeing said web for motion and clutching the draw roll to the oscillating drive during the final portion of the drive reverse stroke for rotating the draw rolls in a reverse direction sufficiently to strip the weld from the seal bars and maintaining the clutching of the draw roll to the drive after termination of said final portion of the drive reverse stroke and throughout the succeeding drive feed stroke for restoring the weld to its previous position between the seal bars and feeding a new length of the web past the seal bars while the seal bars remain separated.

2. A method according to claim 1 and additionally comprising the step of directing a cooling fluid over the welded portion of the web in a direction generally parallel to said web feed direction to cool the weld and also for assisting in maintaining the web in a desired feed plane.

3. The method of claim 1 comprising the step of applying tension to the web downstream of the seal bars while motion of the web is prevented at the end of the feed stroke, severing the web while it is under tension and making said weld while the portion of the web that remains between the seal bars is relaxed due to removal of the tension by said severing step.

4. The method of claim 3, comprising the step of preventing web motion at the end of said feed stroke by braking a draw roll that is gripping the web.

5. The method of claim 1, comprising the step of severing the web along a line that is a short distance downstream of said seal bars for providing an end skirt at the weld.

* * * * *

UNITED STATES PATENT AND TRADEMARK OFFICE
CERTIFICATE OF CORRECTION

PATENT NO. : 4,101,363
DATED : July 18, 1978
INVENTOR(S) : Ronald L. Lotto

It is certified that error appears in the above—identified patent and that said Letters Patent is hereby corrected as shown below:

Col. 2, line 23, change "oof" to --off--

Col. 4, line 30, change "involves" to --involved--

Col. 4, line 34, change "draws" to --draw--

Col. 9, lines 51 & 52 change "effects ring rotation" to

--ring rotation effects--

Col. 11, line 6, delete "link"

Signed and Sealed this

Eighth Day of July 1980

[SEAL]

Attest:

SIDNEY A. DIAMOND

Attesting Officer     Commissioner of Patents and Trademarks